US012766801B2

(12) United States Patent
Mak et al.

(10) Patent No.: US 12,766,801 B2
(45) Date of Patent: Oct. 20, 2026

(54) PREPARATION METHOD OF BISMUTH ION FUNCTIONAL GRAPHENE AGRICULTURAL FILM

(71) Applicant: ChiKui Mak, Hong Kong (CN)

(72) Inventors: ChiKui Mak, Hong Kong (CN); YeungChu Chan, Hong Kong (CN)

(73) Assignee: Chikui Mak, Hong Kong (CN)

( * ) Notice: Subject to any disclaimer, the term of this patent is extended or adjusted under 35 U.S.C. 154(b) by 197 days.

(21) Appl. No.: 18/953,172

(22) Filed: Nov. 20, 2024

(65) Prior Publication Data

US 2025/0074020 A1 Mar. 6, 2025

Related U.S. Application Data

(63) Continuation of application No. PCT/CN2023/114646, filed on Aug. 24, 2023.

(30) Foreign Application Priority Data

Aug. 18, 2022 (CN) ........................ 202210995324.8

(51) Int. Cl.

| | |
|---|---|
| ***B29D 7/01*** | (2006.01) |
| ***C08J 3/22*** | (2006.01) |
| ***C08K 5/09*** | (2006.01) |
| ***C08K 5/103*** | (2006.01) |
| ***C08K 7/24*** | (2006.01) |
| ***C08K 13/06*** | (2006.01) |

(52) U.S. Cl.
CPC ................ *B29D 7/01* (2013.01); *C08J 3/226* (2013.01); *C08K 5/09* (2013.01); *C08K 5/103* (2013.01); *C08K 7/24* (2013.01); *C08K 13/06* (2013.01); *C08J 2423/06* (2013.01); *C08K 2201/003* (2013.01)

(58) Field of Classification Search
CPC ............. B29C 49/28; B29C 49/04106; B29C 49/04; B29C 48/0018; B29C 48/0017; B29C 45/1704; B29C 31/008; B29C 55/28; B29C 53/10; C08J 3/22; B29D 7/01
See application file for complete search history.

*Primary Examiner* — Stella K Yi
(74) *Attorney, Agent, or Firm* — WPAT, PC

(57) ABSTRACT

A preparation method of a bismuth ion functional graphene agricultural film includes: mixing: adding an oil-based bismuth ion graphene material and colloidal particles to a mixer, and then stirring the oil-based bismuth ion graphene material and the colloidal particles followed by drying to obtain a mixed material for later use; granulating: adding the mixed material to an extruder, and then melting the mixed material to obtain a melted material, compounding the melted material to obtain a compounded material, extruding the compounded material followed by cooling to obtain a cooled material, and granulating the cooled material followed by drying to obtain functional masterbatches; and film blowing: adding the functional masterbatches to a film-blowing machine followed by blowing to obtain the bismuth ion functional graphene agricultural film. When applied in top films, the bismuth ion functional graphene agricultural film has a better insulation effect.

20 Claims, No Drawings

PREPARATION METHOD OF BISMUTH ION FUNCTIONAL GRAPHENE AGRICULTURAL FILM

CROSS-REFERENCE TO RELATED APPLICATIONS

This application is a continuation of International Patent Application No. PCT/CN2023/114646, filed on Aug. 24, 2023, which claims the priority of Chinese Patent Application No. 202210995324.8, filed on Aug. 18, 2022, both of which are herein incorporated by reference in their entirety.

TECHNICAL FIELD

The disclosure relates to the field of thin film material preparation technologies, and more particularly to a preparation method of a bismuth ion functional graphene agricultural film.

BACKGROUND

After a preparation method of bismuth ion embedded graphene lattice is developed, a functional graphene material with bismuth ions embedded in graphene lattice is further applied to agricultural films.

The disclosure combines the functional graphene material with the bismuth ions embedded with the agricultural films to produce insulation films for greenhouses, planting films for ground, and waterproof bottom films for ditches etc., i.e., three types of application films including top films, ground films (also referred to as mulch films), and underground films, which are all produced by a same method but serve different purposes in agriculture.

It is found that films for the greenhouses are the most widely applied in terms of thermal insulation purposes. Greenhouse films can achieve the most economical thermal insulation effect for winter planting, and can also be used for greenhouse cultivation or breeding of off-season agricultural products, with a very wide range of uses. In light of this, the disclosure develops application of functional graphene characteristics in the agricultural films.

The functional graphene material with the bismuth ions embedded in the graphene lattice has various advantages and economic value. In the related art, films are made of materials with silver ions embedded graphene lattice, which are certainly effective for sterilization and ultraviolet protection. However, manufacturing costs are relatively high and not affordable for ordinary farmers. Only those engaged in high-value cultivation and breeding would invest, but they also feel that the costs are high. Therefore, improving and optimizing the films to achieve economic value is a necessary pursuit.

Since the bismuth ions are combined with graphene, a resulting film has excellent light transmission properties. Compared to the silver ions, the bismuth ions have better functions in infrared and in thermal insulation. The bismuth ions are more effective at retaining infrared and far-infrared rays for the thermal insulation, which is also a purpose of the disclosure. With the graphene as an ion support, effects of the bismuth ions are amplified. Experiments have found that the bismuth ions have stronger bactericidal capabilities than the silver ions. The bismuth ion graphene also exhibits a photocatalytic effect and can kill bacteria and viruses without direct contact, of course, when in direct contact, bactericidal power of the bismuth ion graphene is stronger than silver.

The bismuth ions have many characteristics and good performance applications, with a high material cost-performance ratio. Moreover, the bismuth ion graphene not only locks in infrared rays for the thermal insulation but can also filter ultraviolet rays and provide radiation protection. The bismuth ion graphene has advantages such as absorbing X-rays and gamma rays etc., and can also isolate light pollution issues, making it an excellent material for environmental protection and green applications.

The bismuth ion graphene has a significant advantage over silver ion graphene in terms of production costs. In the future, the application of thin films in the greenhouse will be very extensive, as bismuth ion graphene films can not only serve as the top films to provide the thermal insulation and rain protection but also serve as the ground films and the waterproof bottom films. The contact between soil and the ground films made of the bismuth ion graphene can kill bacteria and harmful viruses on the ground. Moreover, the action of the bismuth ions effectively inhibits the infection of harmful fungi on plant roots and prevents the invasion of soil pests, making the bismuth ions suitable for application in the bottom films.

SUMMARY

In response to problems in the related art, the disclosure provides a preparation method of a bismuth ion functional graphene agricultural film.

In order to achieve above purposes, the disclosure provides the following technical solutions.

The preparation method of the bismuth ion functional graphene agricultural film, includes:

(1) mixing: adding an oil-based bismuth ion graphene material and colloidal particles to a mixer, and then stirring the oil-based bismuth ion graphene material and the colloidal particles followed by drying to obtain a mixed material for later use;

(2) granulating: adding the mixed material obtained in the step (1) to an extruder, and then melting the mixed material to obtain a melted material, compounding the melted material to obtain a compounded material, extruding the compounded material followed by cooling to obtain a cooled material, and granulating the cooled material followed by drying to obtain functional masterbatches; and (3) film blowing: adding the functional masterbatches to a film-blowing machine followed by blowing to obtain the bismuth ion functional graphene agricultural film.

In an embodiment, the colloidal particles in the step (1) includes one selected from the group consisting of polyvinyl chloride (PVC), ethylene-vinyl acetate copolymer (EVA), polyethylene terephthalate (PET), polyolefin (PO) and polypropylene (PP).

In an embodiment, a weight ratio of the oil-based bismuth ion graphene material to the colloidal particles in the step (1) is 1:100-250.

In an embodiment, time for the stirring in the step (1) is in a range of 1-2 hours (h), and a speed of the stirring is in a range of 60-150 revolutions per minute (r/min).

In an embodiment, a temperature of the drying in the step (1) is in a range of 60-70° C., and time of the drying is in a range of 2-3 h.

In an embodiment, a preparation method of the oil-based bismuth ion graphene material in the step (1) includes: adding 100 parts by weight of natural flake graphite powder and 4 parts by weight of a chelated bismuth ion solution to a reaction kettle, and then adding 776 parts by weight of diethylenetriaminepentaacetic acid (DTPA) to the reaction kettle followed by adjusting a pH of 6 for reaction with a pressure of 0.1 megapascals (MPa) at a temperature of 30° C. for 8 h to obtain a reacted mixture, and adding 100 parts by weight of an impact agent to the reacted mixture for reaction at 30° C. for 4 h to obtain the oil-based bismuth ion graphene material.

In an embodiment, a particle size of the natural flake graphite powder is in a range of 300-15000 mesh, and a weight concentration of the chelated bismuth ion solution is 10000 parts per million (ppm).

In an embodiment, the impact agent is an ethylenediaminetetraacetic acid (EDTA) solution at a concentration of 1 mole per liter (mol/L).

The disclosure further provides an application method of the preparation method of the bismuth ion functional graphene agricultural film, including: applying the bismuth ion functional graphene agricultural film in three types of application films including: a top film, a ground film and an underground film.

Compared to the related art, the disclosure has the following beneficial effects.

(1) The disclosure first applies the bismuth ion functional graphene agricultural film in agricultural films. Compared to silver ions, bismuth ions have better functions in infrared and in thermal insulation, and the bismuth ions are more effective at retaining infrared and far-infrared rays for the thermal insulation.

(2) The bismuth ions have stronger bactericidal capabilities than the silver ions. Bismuth ion graphene also exhibits a photocatalytic effect, and can kill bacteria and viruses without direct contact. The bismuth ion graphene not only locks in infrared rays for the thermal insulation but can also filter ultraviolet rays and provide radiation protection. The bismuth ion graphene has advantages such as absorbing X-rays and gamma rays etc.

(3) When the bismuth ion functional graphene agricultural film is applied in the ground film and the underground film, a contact between soil and the ground film made of the bismuth ion graphene can kill bacteria and harmful viruses on the ground. Moreover, the action of the bismuth ions effectively inhibits the infection of harmful fungi on plant roots and prevents the invasion of soil pests.

DETAILED DESCRIPTION OF EMBODIMENTS

A clear and complete description of the technical solution of the disclosure is provided below in conjunction with specific embodiments. Apparently, the described embodiments are only a part of embodiments of the disclosure, and not all of them. Based on the embodiments of the disclosure, all other embodiments obtained by those skilled in the art without creative labor are within the scope of protection of the disclosure.

All raw materials in the embodiments of the disclosure can be obtained commercially. Non-ionic chelating agents (EDTA and DTPA) and chelated bismuth ions can be purchased from Remy Technology Group, China.

Embodiment 1

A preparation method of a bismuth ion functional graphene agricultural film, includes the following steps (1)-(4).

(1) Preparation of an oil-based bismuth ion graphene material: 100 grams (g) of natural flake graphite powder and 4 g of a chelated bismuth ion solution with a weight concentration of 10000 ppm are added to a reaction kettle, and then 776 g of DTPA at 1 mol/L as a permeation buffer solution are added to the reaction kettle followed by adjusting a pH of 6 for reaction with a pressure of 0.1 MPa at a temperature of 30° C. for 8 h to obtain a reacted mixture, and 100 g of an EDTA solution at 1 mol/L as an impact agent is added to the reacted mixture for reaction at 30° C. for 4 h to obtain the oil-based bismuth ion graphene material.

(2) Mixing: 100 g of the oil-based bismuth ion graphene material and 10 kilograms (kg) of PVC colloidal particles are added to a mixer, and then stirred at a speed of 60 r/min for 1 h followed by drying at 60° C. for 3 h to obtain a mixed material for later use.

(3) Granulating: the mixed material obtained in the step (2) is added to a twin-screw extruder, and then melted to obtain a melted material, the melted material is compounded to obtain a compounded material, the compounded material is extruded followed by cooling to obtain a cooled material, and the cooled material is granulated followed by drying to obtain functional masterbatches.

(4) Film blowing: the functional masterbatches obtained in the step (3) are added to a film-blowing machine followed by blowing to obtain the bismuth ion functional graphene agricultural film.

Embodiment 2

A preparation method of a bismuth ion functional graphene agricultural film, includes the following steps (1)-(4).

(1) Preparation of an oil-based bismuth ion graphene material: 100 g of natural flake graphite powder and 4 g of a chelated bismuth ion solution with a weight concentration of 10000 ppm are added to a reaction kettle, and then 776 g of DTPA at 1 mol/L as a permeation buffer solution are added to the reaction kettle followed by adjusting a pH of 6 for reaction with a pressure of 0.1 MPa at a temperature of 30° C. for 8 h to obtain a reacted mixture, and 100 g of an EDTA solution at 1 mol/L as an impact agent is added to the reacted mixture for reaction at 30° C. for 4 h to obtain the oil-based bismuth ion graphene material.

(2) Mixing: 100 g of the oil-based bismuth ion graphene material and 15 kg of PET colloidal particles are added to a mixer, and then stirred at a speed of 60 r/min for 1 h followed by drying at 60° C. for 3 h to obtain a mixed material for later use.

(3) Granulating: the mixed material obtained in the step (2) is added to a twin-screw extruder, and then melted to obtain a melted material, the melted material is compounded to obtain a compounded material, the compounded material is extruded followed by cooling to obtain a cooled material, and the cooled material is granulated followed by drying to obtain functional masterbatches.

(4) Film blowing: the functional masterbatches obtained in the step (3) are added to a film-blowing machine followed by blowing to obtain the bismuth ion functional graphene agricultural film.

Embodiment 3

A preparation method of a bismuth ion functional graphene agricultural film, includes the following steps (1)-(4).

(1) Preparation of an oil-based bismuth ion graphene material: 100 g of natural flake graphite powder and 4 g of a chelated bismuth ion solution with a weight concentration of 10000 ppm are added to a reaction kettle, and then 776 g of DTPA at 1 mol/L are added as a permeation buffer solution to the reaction kettle followed by adjusting a pH of 6 for reaction with a pressure of 0.1 MPa at a temperature of 30° C. for 8 h to obtain a reacted mixture, and 100 g of an EDTA solution at 1 mol/L as an impact agent is added to the reacted mixture for reaction at 30° C. for 4 h to obtain the oil-based bismuth ion graphene material.

(2) Mixing: 100 g of the oil-based bismuth ion graphene material and 10 kg of PP colloidal particles are added to a mixer, and then stirred at a speed of 60 r/min for 1.5 h followed by drying at 60° C. for 3 h to obtain a mixed material for later use.

(3) Granulating: the mixed material obtained in the step (2) is added to a twin-screw extruder, and then melted to obtain a melted material, the melted material is compounded to obtain a compounded material, the compounded material is extruded followed by cooling to obtain a cooled material, and the cooled material is granulated followed by drying to obtain functional masterbatches.

(4) Film blowing: the functional masterbatches obtained in the step (3) are added to a film-blowing machine followed by blowing to obtain the bismuth ion functional graphene agricultural film.

Embodiment 4

A preparation method of a bismuth ion functional graphene agricultural film, includes the following steps (1)-(4).

(1) Preparation of an oil-based bismuth ion graphene material: 100 g of natural flake graphite powder and 4 g of a chelated bismuth ion solution with a weight concentration of 10000 ppm are added to a reaction kettle, and then 776 g of DTPA at 1 mol/L as a permeation buffer solution are added to the reaction kettle followed by adjusting a pH of 6 for reaction with a pressure of 0.1 MPa at a temperature of 30° C. for 8 h to obtain a reacted mixture, and 100 g of an EDTA solution at 1 mol/L as an impact agent is added to the reacted mixture for reaction at 30° C. for 4 h to obtain the oil-based bismuth ion graphene material.

(2) Mixing: 100 g of the oil-based bismuth ion graphene material and 15 kg of PP colloidal particles are added to a mixer, and then stirred at a speed of 100 r/min for 2 h followed by drying at 70° C. for 3 h to obtain a mixed material for later use.

(3) Granulating: the mixed material obtained in the step (2) is added to a twin-screw extruder, and then melted to obtain a melted material, the melted material is compounded to obtain a compounded material, the compounded material is extruded followed by cooling to obtain a cooled material, and the cooled material is granulated followed by drying to obtain functional masterbatches.

(4) Film blowing: the functional masterbatches obtained in the step (3) are added to a film-blowing machine followed by blowing to obtain the bismuth ion functional graphene agricultural film.

Embodiment 5

A preparation method of a bismuth ion functional graphene agricultural film, includes the following steps (1)-(4).

(1) Preparation of an oil-based bismuth ion graphene material: 100 g of natural flake graphite powder and 4 g of a chelated bismuth ion solution with a weight concentration of 10000 ppm are added to a reaction kettle, and then 776 g of DTPA at 1 mol/L are added as a permeation buffer solution to the reaction kettle followed by adjusting a pH of 6 for reaction with a pressure of 0.1 MPa at a temperature of 30° C. for 8 h to obtain a reacted mixture, and 100 g of an EDTA solution at 1 mol/L as an impact agent is added to the reacted mixture for reaction at 30° C. for 4 h to obtain the oil-based bismuth ion graphene material.

(2) Mixing: 100 g of the oil-based bismuth ion graphene material and 10 kg of EVA colloidal particles are added to a mixer, and then stirred at a speed of 60 r/min for 1 h followed by drying at 60° C. for 2 h to obtain a mixed material for later use.

(3) Granulating: the mixed material obtained in the step (2) is added to a twin-screw extruder, and then melted to obtain a melted material, the melted material is compounded to obtain a compounded material, the compounded material is extruded followed by cooling to obtain a cooled material, and the cooled material is granulated followed by drying to obtain functional masterbatches.

(4) Film blowing: the functional masterbatches obtained in the step (3) are added to a film-blowing machine followed by blowing to obtain the bismuth ion functional graphene agricultural film.

The bismuth ion functional graphene agricultural films obtained by above embodiments 1-5 are applied in agricultural top films and light-transmitting performance of the bismuth ion functional graphene agricultural films is tested with results shown in Table 1.

TABLE 1 the light-transmitting performance of respective embodiments

| Project | Visible light transmittance % | Ultraviolet light transmittance % | Infrared blocking rate % |
|---|---|---|---|
| Embodiment 1 | 85.9 | 15.9 | 80.5 |
| Embodiment 2 | 86.7 | 16.7 | 83.7 |
| Embodiment 3 | 85.3 | 14.1 | 82.2 |
| Embodiment 4 | 84.8 | 14.5 | 81.9 |
| Embodiment 5 | 87.5 | 15.2 | 82.4 |

The bismuth ion functional graphene agricultural films obtained by above embodiments 1-5 are applied in agricultural ground films and antibacterial performance of the bismuth ion functional graphene agricultural films is tested with a testing standard of ASTM E2315-2016. A preservation number of *Escherichia coli* used for testing is ATCC8739, and a preservation number of *Staphylococcus aureus* used for testing is ATCC6538. Test results are as shown in Table 2.

TABLE 2 antibacterial performance of the bismuth ion functional graphene agricultural film of each embodiment

| Project | Antibacterial rate against *Escherichia coli* % | Antibacterial rate against *Staphylococcus aureus* % |
|---|---|---|
| Embodiment 1 | 99.93 | 99.91 |
| Embodiment 2 | 99.97 | 99.94 |
| Embodiment 3 | 99.91 | 99.97 |
| Embodiment 4 | 99.96 | 99.93 |
| Embodiment 5 | 99.92 | 99.95 |

Although the embodiments of the disclosure have been shown and described, it is understood by those skilled in the art that various changes, modifications, substitutions, and variations can be made to these embodiments without departing from the principles and spirit of the disclosure. The scope of the disclosure is limited by the appended claims and their equivalents.

What is claimed is:

1. A preparation method of a bismuth ion functional graphene agricultural film, comprising:

(1) mixing: adding an oil-based bismuth ion graphene material and colloidal particles to a mixer, and then stirring the oil-based bismuth ion graphene material and the colloidal particles followed by drying to obtain a mixed material for later use;

(2) granulating: adding the mixed material obtained in the step (1) to an extruder, and then melting the mixed material to obtain a melted material, compounding the melted material to obtain a compounded material, extruding the compounded material followed by cooling to obtain a cooled material, and granulating the cooled material followed by drying to obtain functional masterbatches; and (3) film blowing: adding the functional masterbatches to a film-blowing machine followed by blowing to obtain the bismuth ion functional graphene agricultural film.

2. The preparation method of the bismuth ion functional graphene agricultural film as claimed in claim 1, wherein the colloidal particles in the step (1) comprises one selected from the group consisting of polyvinyl chloride (PVC), ethylene-vinyl acetate copolymer (EVA), polyethylene terephthalate (PET), polyolefin (PO) and polypropylene (PP).

3. The preparation method of the bismuth ion functional graphene agricultural film as claimed in claim 1, wherein a weight ratio of the oil-based bismuth ion graphene material to the colloidal particles in the step (1) is 1:100-250.

4. The preparation method of the bismuth ion functional graphene agricultural film as claimed in claim 1, wherein time for the stirring in the step (1) is in a range of 1-2 hours (h), and a speed of the stirring in the step (1) is in a range of 60-150 revolutions per minute (r/min).

5. The preparation method of the bismuth ion functional graphene agricultural film as claimed in claim 1, wherein a temperature of the drying in the step (1) is in a range of 60-70° C., and time of the drying in the step (1) is in a range of 2-3 h.

6. The preparation method of the bismuth ion functional graphene agricultural film as claimed in claim 1, wherein a preparation method of the oil-based bismuth ion graphene material in the step (1) comprises:

adding 100 parts by weight of natural flake graphite powder and 4 parts by weight of a chelated bismuth ion solution to a reaction kettle, and then adding 776 parts by weight of diethylenetriaminepentaacetic acid (DTPA) to the reaction kettle followed by adjusting a pH of 6 for reaction with a pressure of 0.1 megapascals (MPa) at a temperature of 30° C. for 8 h to obtain a reacted mixture, and adding 100 parts by weight of an impact agent to the reacted mixture for reaction at 30° C. for 4 h to obtain the oil-based bismuth ion graphene material.

7. The preparation method of the bismuth ion functional graphene agricultural film as claimed in claim 6, wherein a particle size of the natural flake graphite powder is in a range of 300-15000 mesh, and a weight concentration of the chelated bismuth ion solution is 10000 parts per million (ppm).

8. The preparation method of the bismuth ion functional graphene agricultural film as claimed in claim 6, wherein the impact agent is an ethylenediaminetetraacetic acid (EDTA) solution at a concentration of 1 mole per liter (mol/L).

9. An application method of the preparation method of the bismuth ion functional graphene agricultural film as claimed in claim 1, comprising: applying the bismuth ion functional graphene agricultural film in three types of application films including: a top film, a ground film and an underground film.

10. A preparation method of a bismuth ion functional graphene agricultural film, comprising:

(1) preparation of an oil-based bismuth ion graphene material: adding 100 grams (g) of flake graphite powder and 4 g of a chelated bismuth ion solution to a reaction kettle, and then adding 776 g of DTPA to the reaction kettle followed by adjusting a pH of 6 for reaction with a pressure of 0.1 MPa at a temperature of 30° C. for 8 h to obtain a reacted mixture, and adding 100 g of a EDTA solution as an impact agent to the reacted mixture for reaction at 30° C. for 4 h to obtain the oil-based bismuth ion graphene material;

(2) mixing: adding the oil-based bismuth ion graphene material and colloidal particles to a mixer, and then stirring the oil-based bismuth ion graphene material and the colloidal particles followed by drying to obtain a mixed material for later use;

(3) granulating: adding the mixed material obtained in the step (1) to an extruder, and then melting the mixed material to obtain a melted material, compounding the melted material to obtain a compounded material, extruding the compounded material followed by cooling to obtain a cooled material, and granulating the cooled material followed by drying to obtain functional masterbatches; and (4) film blowing: adding the functional masterbatches to a film-blowing machine followed by blowing to obtain the bismuth ion functional graphene agricultural film.

11. The preparation method of the bismuth ion functional graphene agricultural film as claimed in claim 10, wherein a particle size of the natural flake graphite powder is in a range of 300-15000 mesh, and a weight concentration of the chelated bismuth ion solution is 10000 ppm.

12. The preparation method of the bismuth ion functional graphene agricultural film as claimed in claim 11, wherein a concentration of the EDTA solution is 1 mol/L.

13. The preparation method of the bismuth ion functional graphene agricultural film as claimed in claim 10, wherein a weight ratio of the oil-based bismuth ion graphene material to the colloidal particles in the step (2) is 1:100-250.

14. The preparation method of the bismuth ion functional graphene agricultural film as claimed in claim 10, wherein time for the stirring in the step (2) is in a range of 1-2 h, and a speed of the stirring in the step (2) is in a range of 60-150 r/min.

15. The preparation method of the bismuth ion functional graphene agricultural film as claimed in claim 10, wherein a temperature of the drying in the step (2) is in a range of 60-70° C., and time of the drying in the step (2) is in a range of 2-3 h.

16. The preparation method of the bismuth ion functional graphene agricultural film as claimed in claim 10, wherein the colloidal particles in the step (2) are PVC, and a weight ratio of the oil-based bismuth ion graphene material to the colloidal particles in the step (2) is 1:100.

17. The preparation method of the bismuth ion functional graphene agricultural film as claimed in claim 10, wherein the colloidal particles in the step (2) are PET, and a weight ratio of the oil-based bismuth ion graphene material to the colloidal particles in the step (2) is 1:150.

18. The preparation method of the bismuth ion functional graphene agricultural film as claimed in claim 10, wherein the colloidal particles in the step (2) are PP, and a weight ratio of the oil-based bismuth ion graphene material to the colloidal particles in the step (2) is 1:150.

19. The preparation method of the bismuth ion functional graphene agricultural film as claimed in claim 18, wherein time for the stirring in the step (2) is 2 h, and a speed of the stirring in the step (2) is 100 r/min; a temperature of the drying in the step (2) is 70° C., and time of the drying in the step (2) is 3 h.

20. The preparation method of the bismuth ion functional graphene agricultural film as claimed in claim 10, wherein the colloidal particles in the step (2) are EVA, and a weight ratio of the oil-based bismuth ion graphene material to the colloidal particles in the step (2) is 1:100.

* * * * *